B. G. CLARK.
LACING STUD FOR BOOTS, GLOVES, AND THE LIKE.
APPLICATION FILED DEC. 29, 1910.
1,161,027.                                    Patented Nov. 23, 1915.
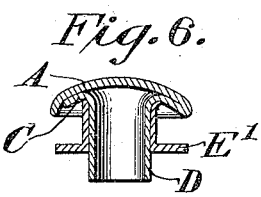
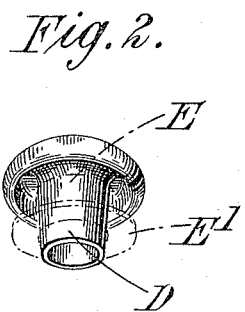
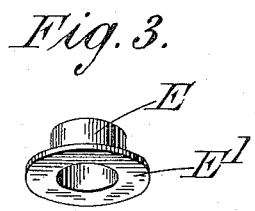
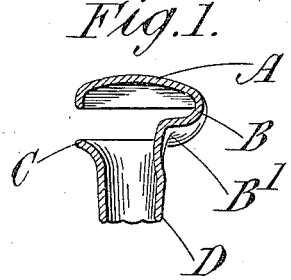
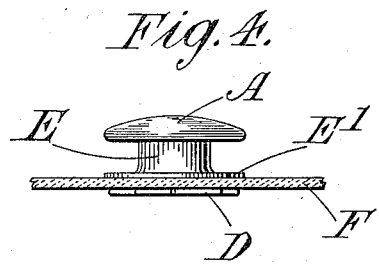
Witnesses:                                      Inventor:
Bernard Cowen                                   Byron George Clark
Harry Lewis                                by   Henry D. Williams
                                                          Atty.

UNITED STATES PATENT OFFICE.

BYRON GEORGE CLARK, OF LONDON, ENGLAND, ASSIGNOR TO UNITED SHOE MACHINERY COMPANY, OF PATERSON, NEW JERSEY, A CORPORATION OF NEW JERSEY.

LACING-STUD FOR BOOTS, GLOVES, AND THE LIKE.

1,161,027.

Specification of Letters Patent.

Patented Nov. 23, 1915.

Application filed December 29, 1910. Serial No. 599,801.

*To all whom it may concern:*

Be it known that I, BYRON GEORGE CLARK, a subject of the King of England, residing at North Kensington, London, England, have invented certain new and useful Improvements in Lacing-Studs for Boots, Gloves, and the like, of which the following is a specification.

This invention relates to improvements in lacing studs for boots, gloves and the like, and one of its objects is to provide a stud which shall be light and strong and which shall have no rough edges or corners upon which the apparel of the wearer would be likely to catch or which would wear out or fray the lacing.

Another important object of the invention is to provide a stud of such design that it may be produced with facility from sheet material and manufactured upon a commercial scale with automatic machinery at a low price.

To this end an important feature of the invention consists in a stud having its parts so arranged as to reinforce and strengthen the stud where it is to be subject to strain so that comparatively thin and easily worked material may be used in its construction. For example, the curved head of a stud of this character is likely to become dented or flattened in use but this is prevented in accordance with the present invention by forming the head of two thicknesses of material, the inner of which is a stiff flange which is disposed in engagement with the under side of the curved piece which forms the outer and conspicuous portion of the head.

According to one feature of this invention the head and the shank of the stud are formed in another piece and as a preferred method of manufacture the stud is first stamped from a piece of metal in the form of a lacing hook and shank, the shank and its surrounding flange being finally pressed in toward the head until the flange is pressed flat against the underside of the head.

A further feature of this invention consists in providing the shank of the lacing stud with a tight fitting sleeve having a projecting flange which, when the stud is in place in the article to which it is to be applied, will rest on the upper surface thereof. The lower portion of the shank is then finally stamped, spread or clenched over on the under side of the article to secure it in position.

The features and advantages above set forth and others incident to the invention will be best understood and appreciated from the following description of preferred embodiments thereof selected for purposes of illustration and shown in the accompanying drawings, in which,—

Figure 1 is a central section of a form of hook from which the stud is formed in the preferred construction; Fig. 2 is a perspective view of the finished stud showing the flanged sleeve in dotted lines; Fig. 3 is an elevation of the sleeve and its projecting flange; Fig. 4 shows a stud secured to the article to which it is to be applied, Fig. 5 shows a lacing stud without the surrounding flanged sleeve in a condition to be applied to the article by other means than those illustrated in Figs. 2–4, and, Fig. 6 is a view in central section of the completed stud.

From a strip of metal of the required width and thickness an article in the form of a lacing hook is stamped out as shown in Fig. 1. This hook has a circular convex head A with a downwardly extending peripheral flange and is arranged so that the shank D comes immediately under the center of the head. The back or hook portion B is preferably hollowed as at $B^1$, that is to say is formed in accordance with the construction in which the lower member of the hook is both pressed in toward the head and toward the center of the button. The shank is now pressed in toward the head so that the lower member $B^1$ of the hook and the flange C surrounding the shank are pressed close to the underside of the head. In this operation the flange C is carried within the downwardly extending peripheral flange of the head so that its rough edge is embraced and covered by a smooth surface of the head. This forms a stud in which a round button-like head surmounts a cylindrical portion. The stud may be secured to the article for which it is required by any well known and convenient means.

A preferable means of securing the stud in the article to which it is to be applied is to force on to the shank D the flange sleeve E E¹ until it is in the position illustrated in Fig. 2. Finally to secure the stud to the article F the portion of the shank D projecting below the flange E¹ is passed through the article F and is spread or upset as shown in Fig. 4 at D. This method of spreading may be carried into effect by well known fastener setting machinery which, however, forms no part of the present invention.

In Fig. 5 the stud is shown without the surrounding flanged sleeve E E¹ but is shown with the lower portion of the flange spread or stamped out. This spread portion can be allowed to conveniently rest on the upper surface of the article and the stud can then be secured thereto by any well known means.

Although in the foregoing description a stud has been described which is first stamped in the form of a lacing hook, it is obvious that this hook may have many forms, in one of which for instance the back or hook portion may nearly surround the head. The same procedure in the manufacture of the finished lacing stud would still be adhered to. Also studs of this description may be conveniently employed as rivets suitable for light work, in which case the shank would be passed through the members to be riveted and subsequently opened out.

What I claim as my invention and desire to secure by Letters Patent is:—

1. A lacing stud or the like comprising an integral tubular shank having an annular flange at its upper end, a curved covering portion of greater diameter than said flange arranged to embrace the periphery of the flange about the greater part of its circumference, and a neck having a width equal to the remainder of the circumference of the flange and a length substantially equal to the difference between the diameters of the covering portion and the annular flange, said flange and neck being disposed in contact with the under side of the covering portion.

2. A lacing stud or the like having a shank comprising two concentric tubular portions one fitting concentrically over the other, and a head comprising two connected pieces of material in engagement at their flat surfaces, the end of the outer shank portion abutting against the lower side of the under portion of the head and the upper portion of the head extending over the under portion of the head and embracing its peripheral edges outside the outer portion of the shank.

3. A lacing stud or the like having a shank with a laterally extending annular flange, and a covering piece disposed in contact with the upper surface of the flange, embracing one part of the periphery of the flange and integrally connected to another part.

4. A lacing stud or the like having a shank with a laterally extending annular flange, and a covering piece disposed in contact with the flange over its entire upper surface, said covering piece having a downwardly turned edge merging at one point into the flange and embracing the remainder of its periphery.

In testimony whereof I have signed my name to this specification in the presence of two subscribing witnesses.

BYRON GEORGE CLARK.

Witnesses:
  RONALD S. DOLLEYMORE,
  HARRY B. BRIDGE.

Copies of this patent may be obtained for five cents each, by addressing the "Commissioner of Patents, Washington, D. C."

It is hereby certified that in Letters Patent No. 1,161,027, granted November 23, 1915, upon the application of Byron George Clark, of London, England, for an improvement in "Lacing-Studs for Boots, Gloves, and the Like," errors appear in the printed specification requiring correction as follows: Page 1, line 32, after the word "with" insert the words *one feature of;* same page, line 39, for the word "one" read *another;* line 41, for the word "another" read *one;* and that the said Letters Patent should be read with these corrections therein that the same may conform to the record of the case in the Patent Office.

Signed and sealed this 28th day of March, A. D., 1916.

[SEAL.]

J. T. NEWTON,
*Acting Commissioner of Patents.*

Cl. 24–144.